US008681958B2

(12) United States Patent
Chatterjee (10) Patent No.: US 8,681,958 B2
(45) Date of Patent: Mar. 25, 2014

(54) METHOD FOR PRESENTING ADDITIONAL INFORMATION ABOUT A TELECOMMUNICATION USER (75) Inventor: Koushik Chatterjee, Orlando, FL (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1576 days.

(21) Appl. No.: 11/904,871

(22) Filed: Sep. 28, 2007

(65) Prior Publication Data

US 2009/0086939 A1    Apr. 2, 2009

(51) Int. Cl.
H04M 1/56 (2006.01)
H04M 3/42 (2006.01)

(52) U.S. Cl.
USPC ..................... 379/142.06; 455/415

(58) Field of Classification Search
USPC ............... 379/88.19–88.21, 142.06
See application file for complete search history.

(56) References Cited

U.S. PATENT DOCUMENTS

| 5,546,447 | A   |   | 8/1996  | Skarbo et al.  |         |
|-----------|-----|---|---------|---------------|---------|
| 6,385,586 | B1  |   | 5/2002  | Dietz         |         |
| 6,539,359 | B1  |   | 3/2003  | Ladd et al.   |         |
| 6,675,008 | B1  |   | 1/2004  | Paik et al.   |         |
| 6,681,004 | B2  |   | 1/2004  | Strubbe et al.|         |
| 6,785,368 | B1  | * | 8/2004  | Eason et al.  | 379/88.19 |
| 6,873,692 | B1  |   | 3/2005  | Silver et al. |         |
| 7,027,986 | B2  |   | 4/2006  | Caldwell et al.|        |
| 7,236,774 | B2  | * | 6/2007  | Lee           | 455/417 |
| 7,340,390 | B2  |   | 3/2008  | Hurst et al.  |         |
| 7,454,348 | B1  |   | 11/2008 | Kapilow et al.|         |
| 7,466,801 | B2  |   | 12/2008 | Miller et al. |         |
| 7,606,358 | B2  |   | 10/2009 | McGary et al. |         |
| 7,792,095 | B2  |   | 9/2010  | Srinivansan   |         |
| 7,945,037 | B1  | * | 5/2011  | Hogg, Jr.     | 379/211.02 |
| 7,945,253 | B2  |   | 5/2011  | Zellner       |         |
| 8,553,864 | B2  |   | 10/2013 | Chatterjee    |         |
| 2003/0055667 | A1 |   | 3/2003  | Sgambaro et al. |       |
| 2004/0066920 | A1 | * | 4/2004  | Vandermeijden | 379/88.19 |
| 2004/0166832 | A1 | * | 8/2004  | Portman et al. | 455/412.1 |
| 2005/0100150 | A1 |   | 5/2005  | Dhara et al.  |         |
| 2007/0026852 | A1 |   | 2/2007  | Logan et al.  |         |
| 2007/0101413 | A1 | * | 5/2007  | Vishik et al. | 726/5   |
| 2007/0116239 | A1 |   | 5/2007  | Jacobi et al. |         |

(Continued)

OTHER PUBLICATIONS

U.S. Appl. No. 12/146,049; Non-Final Rejection dated Jun. 22, 2012; 13 pages.

(Continued)

*Primary Examiner* — Simon Sing
*Assistant Examiner* — Solomon Bezuayehu
(74) *Attorney, Agent, or Firm* — Swanson & Bratschun, L.L.C.

(57) ABSTRACT

A method and system for presenting additional information about a user are provided. The user may be a calling party or a called party. A request for information in addition to the information normally contained in the caller ID may be constructed and sent to a repository of additional information that returns the additional information. If the user is a calling party, the additional information may be presented on the called party's communication device. If the user is a called party, the additional information may be presented on the calling party's communication device. A system including the repository may receive the request. An authoring and editing component of the system may allow the user or others to edit the additional information about the user. The system may select and send the additional information based on a set of parameters in the request and the access type of the requestor.

31 Claims, 4 Drawing Sheets

(56) References Cited

U.S. PATENT DOCUMENTS

| | | |
|---|---|---|
| 2007/0143662 A1 | 6/2007 | Carlson et al. |
| 2008/0147404 A1 | 6/2008 | Liu et al. |
| 2008/0152097 A1* | 6/2008 | Kent .................... 379/93.01 |
| 2008/0235084 A1 | 9/2008 | Quoc et al. |
| 2009/0043657 A1 | 2/2009 | Swift et al. |
| 2009/0110162 A1 | 4/2009 | Chatterjee |
| 2009/0110179 A1 | 4/2009 | Elsey et al. |
| 2009/0161845 A1 | 6/2009 | Adams et al. |
| 2009/0203361 A1 | 8/2009 | Huang et al. |
| 2009/0323912 A1 | 12/2009 | Toner et al. |
| 2011/0077046 A1* | 3/2011 | Durand et al. ............. 455/550.1 |
| 2014/0003594 A1 | 1/2014 | Chatterjee |

OTHER PUBLICATIONS

U.S. Appl. No. 12/146,049; Non-Final Rejection dated Oct. 6, 2011; 8 pages.

U.S. Appl. No. 12/146,049; Notice of Allowance dated Feb. 16, 2012; 5 pages.

U.S. Appl. No. 11/977,545; Non Final Office Action dated Mar. 12, 2012; 12 pages.

U.S. Appl. No. 11/977,545; Non-Final Rejection dated Sep. 29, 2011; 10 pages.

U.S. Appl. No. 11/977,545; Notice of Allowance dated Jun. 3, 2013; 17 pages.

U.S. Appl. No. 12/146,049; Non-Final Rejection dated Jul. 19, 2013; 13 pages.

U.S. Appl. No. 11/977,545; Non Final Rejection dated Dec. 21, 2012; 19 pages.

U.S. Appl. No. 12/146,049; Final Rejection dated Dec. 31, 2012; 11 pages.

U.S. Appl. No. 11/977,545; Final Rejection dated Jul. 17, 2012; 20 pages.

U.S. Appl. No. 11/977,545; Issue Notification dated Sep. 18, 2013; 1 page.

U.S. Appl. No. 14/016,886; Non-Final Office Action dated Dec. 9, 2013; 15 pages.

U.S. Appl. No. 12/146,049; Final Rejection dated Jan. 29, 2014; 11 pages.

* cited by examiner

METHOD FOR PRESENTING ADDITIONAL INFORMATION ABOUT A TELECOMMUNICATION USER

BACKGROUND

1. Field of the Invention

The principles of the present invention relate generally to an improved telecommunication system, and in particular, to an improved method of using a communication device. Still more particularly, the principles of the present invention relate to a method, apparatus, and computer usable program product for presenting additional information about a telecommunication user on the communication device.

2. Description of the Related Art

Telecommunication involves two or more communication devices communicating with each other using a communication network. For example, two telephones may be able to communicate with each other using a telecommunication network called public switched telephone network (PSTN). PSTN is primarily a voice telecommunication network for enabling telephone-based telecommunication between two or more parties.

Data processing systems are often connected with other devices and data processing systems using a data network. The data network provides the networked data processing systems and devices with a communications medium over which data may be exchanged with each other.

Many types of wired and wireless networks are available for networking data processing systems, as well as communication devices. Wired networks utilize physical wires that can carry electrical data signals for connecting data processing systems and communication devices to communicate over the network Wireless networks generally utilize radio waves for connecting the data processing systems and communication devices to the network in a wireless manner.

A communication device is a device from which a telecommunication call may be placed, or using which a telecommunication call may be received. The term "communication devices" refers to the collection of all devices used for telecommunication. For example, a communication device can be the familiar telephone, a computer with a telecommunication enabling software application, a telephone-like device that works over data networks instead of a plain old telephone system (POTS) line, a wireless or cellular phone, or any other device used for telecommunication. A communication device is any one of these communication devices. Communication devices may also include devices and applications capable of communicating in other ways, for example, by text messaging, instant messaging including text, audio, video, images, and documents.

Various communication devices are capable of communicating with each other using a variety of networks. Some communication devices are able to communicate using analog signals over telecommunication networks, which are generally analog communication networks. Other communication devices, such as a voice over Internet Protocol (VOIP) enabled telephone, communicate over data networks. VOIP is a telecommunication method for transmitting voice communications over a data network such as the Internet. Common VOIP implementations are in telephony where telephone conversations are partly or entirely carried over the Internet from a caller telephone to a called telephone. A VOIP call is a voice call connected using VOIP technology.

A calling party, calling user, or a caller, is a person or entity placing a telecommunication call. A called party, or a called user, is a person or entity receiving a telecommunication call. A calling communication device is a communication device used for placing a telecommunication call. A called communication device is a communication device used for receiving a telecommunication call. A calling phone number, or a caller phone number, is a number associated with the calling communication device. A called phone number is a number associated with a called communication device. A calling party name, or a caller name, is the name of the calling party. A called party name is the name of the called party.

Caller identification (Caller ID) is a feature commonly known to the telecommunication industry and to the users of telecommunication services. When a call is received on a communication device equipped with a display screen, such as on a modern day wire line or wireless phone, generally, a calling phone number with or without a name associated with the calling phone number is displayed on the communication device's display screen. Calling phone number with or without an associated name is called "caller ID."

Caller ID is also known as calling line identification (CLI) when provided via an ISDN connection to a PABX. In some countries, the terms caller display, call display, calling line identification presentation (CLIP), call capture, or just calling line identity (CLID) are also used to describe the caller ID feature.

Modifications to the caller ID include using an address in place of the name, such as for 911 purposes. However, caller ID is insufficient for information exchange, such as for messaging between users.

SUMMARY

In order to provide more information than the information contained in caller ID, and to provide information about a called party, which is not supported by caller ID, the illustrative embodiments provide a method and system for presenting additional information about a user. A user who may be a calling party may be identified using a caller ID. A request may be constructed for information about the user in addition to the information contained in the caller ID. Such information may form additional information about the user. The request may be sent to a repository of the additional information. In response to the request, the additional information about the user may be received from the repository. The received additional information about the user may be presented, such as to the called party.

In another embodiment, the user may be a called party. A request may be constructed for additional information about the user. The request may be sent to a repository of the additional information. In response to the request, the additional information about the user may be received from the repository. The received additional information about the user may be presented, such as to the calling party.

A system for providing additional information about a user may include a communication component that may receive from a communication device a request for the additional information about the user. The system may further include an authoring and editing component that may receive instructions from the user for editing the additional information about the user. An authentication and access control component included in the system may determine an access type of the requestor. The system may select the additional information based on a set of parameters in the request and the access type. The system may send the selected additional information in a response to the communication device for display thereon.

BRIEF DESCRIPTION OF THE DRAWINGS

The novel features believed characteristic of the illustrative embodiments are set forth in the appended claims. The illustrative embodiments, however, as well as a preferred mode of use, will best be understood by reference to the following detailed description of an illustrative embodiment when read in conjunction with the accompanying drawings, wherein:

DETAILED DESCRIPTION OF THE DRAWINGS

Users of telecommunication services find caller ID useful because of the information it provides prior to accepting the call made to their communication device. Caller ID identifies the calling user by providing a calling number and may be a name of a calling user to the called user.

Illustrative embodiments recognize that certain presently available communication devices include telephony as well as data capabilities. These communication devices may conduct telephony using telecommunication network data network, or both. Illustrative embodiments recognize, for example, that a phone may have access to only telecommunication network on which it places and receives telecommunication calls. The phone, however, may also be able to make a data call, such as by including a modem and using a dial-up service to connect to a data network such as the Internet. As another example, a phone may have access to both, a telecommunication network and a data network. The phone may use telecommunication network for making a traditional analog call and the data network for making a VOIP call.

Illustrative embodiments further recognize that presently available caller ID information is limited in content and scope. For example, caller ID typically only informs a called user about the calling number and sometimes a name associated therewith. However, often, a called user may not be able to recognize the calling number or name and may be at a loss whether to accept the call.

The illustrative embodiments further recognize that a caller ID can be spoofed. A user can employ presently available methods that hide the calling number, alter the calling number, hide the name, alter the name, or pretend to be a calling number and name different from the actual calling number and name. When a calling user employs such methods, the called user is at a further loss for information the user may need to decide whether to accept the call.

The illustrative embodiments also recognize that when caller ID is available, a called user may desire more information about the caller, caller's organization, subject of the anticipated conversation, and any other information that may be beneficial to the called user in making a decision whether to accept a call. Thus, a method, apparatus, and computer program product for presenting additional information about a telecommunication user may be useful. Such a method, apparatus and computer program product are provided in the illustrative embodiments below, and may provide enhanced, additional, supplemental or related information about a caller identified by a caller ID, as well as about a called party.

Figure 1:
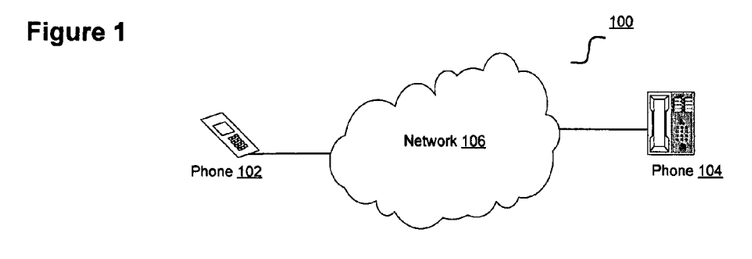
FIG. 1 depicts a block diagram of a telecommunication environment in which the illustrative embodiments may be implemented.

With reference to FIG. 1, this figure depicts a block diagram of a telecommunication environment in which the illustrative embodiments may be implemented. Environment 100 includes phone 102 capable of telecommunicating with phone 104 using network 106. Phones 102 and 104 are examples of communication devices. Network 106 may include a data network, such as a local area network (LAN), a wide area network (WAN), for example, the Internet. Network 106 may also include a telecommunication network such as PSTN.

Figure 2:
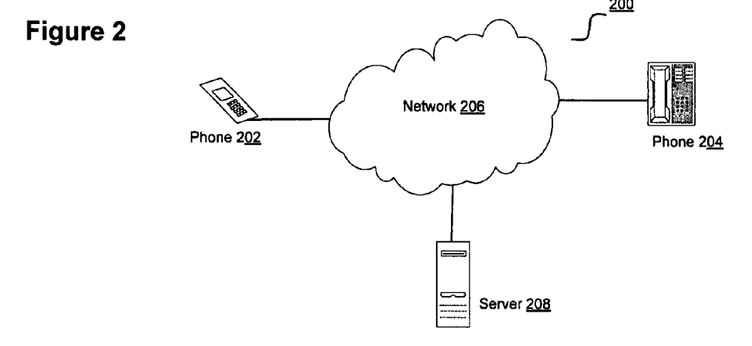
FIG. 2 depicts a block diagram of an enhanced telecommunication environment in accordance with an illustrative embodiment.

With reference to FIG. 2, this figure depicts a block diagram of an enhanced telecommunication environment in accordance with an illustrative embodiment. Environment 200 includes phone 202 capable of telecommunicating with phone 204 using network 206 in the manner of phones 102 and 104 using network 106 in FIG. 1. Phones 202 and 204 may be implemented using phones 102 and 104 respectively in FIG. 1, and network 206 may be implemented using network 106 in FIG. 1.

While either phone may place and receive calls, phone 202 is exemplarily described here as the communication device (i.e., called phone) that receives a call placed from phone 204 (i.e., calling phone). Phone 202 is a communication device that is equipped with a display capability, such as a liquid crystal display (LCD) screen, and can display the same or greater amounts of information as compared to presently available caller ID.

Furthermore, whether a particular call is received from a data network or a telecommunication network within network 206, phone 202 is capable of communicating with server 208 over a data network within network 206. When phone 202 receives a call that includes a caller ID, phone 202 may request and receive additional information about the caller identified in the caller ID from server 208.

Figure 3A:
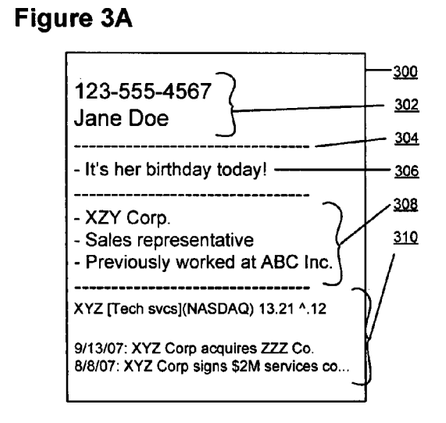
FIG. 3A depicts a display of information in accordance with an illustrative embodiment.

With reference to FIG. 3A, this figure depicts a display of information in accordance with an illustrative embodiment. Display 300 may be a display screen on a communication device, such as phone 202 in FIG. 2. Once the communication device including display 300 receives additional information, such as in the manner described with respect to server 208 in FIG. 2, that information in combination with the caller ID is displayed on display 300. In one embodiment, caller ID information may be replaced by the additional information received from the server. In another embodiment, the caller ID information may be modified and displayed in addition to the additional information. In another embodiment, the caller ID information may be displayed as it was originally received, in conjunction with the additional information.

In FIG. 3A, display 300 is shown to include caller ID information 302, which includes a calling number and a name associated with that calling number. Display 300 may include some visual cues that the information being displayed has been grouped in some logical manner. For example, graphical dividers, dividing lines, blank space, color, type or size of fonts, and other similar techniques may be used for grouping information displayed on display 300. Dividing line 304 is an example of techniques that may be used for such grouping.

Messages relating to the caller may also be included in the additional information. For example, message 306 informs the called party that the caller's birthday is today. Message 306 may alternatively inform the user that the caller's birthday just passed or is coming up. Contents of such messages, selection of such messages for display, and location on the display screen where such messages may be displayed are configurable, as described in further detail with respect to FIG. 5 below.

Assuming that the caller is calling the called part for a business matter, additional information, such as caller's business profile 308, may be included in the additional information displayed on display 300. In the illustrated example, the caller's business profile 308 informs the called party that the caller works for XYZ corporation as a sales representative, and previously worked for ABC Inc. Such information can be helpful to the called party in gaining some idea about the purpose of the call and preparing for the call.

Additional information such as business information 310 may also be helpful to the called party in learning what the call may concern. In the illustrated example, business information 310 informs the called party that the caller's company—XYZ Corp. is engaged in technology services business, trades on NASDAQ stock exchange, the present value and trend of the company's stock and recent news items relating to the company or its business. In one embodiment, advertising or marketing information associated with the company may be presented in a similar manner.

The information depicted in FIG. 3A is only exemplary and not intended to be limiting on the illustrative embodiment. Other information may be added to or substituted for the exemplary information in FIG. 3A. Furthermore, the additional information displayed on display 300 may exceed the display space and the display may be scrolled to display all the additional information available about the caller, as described with respect to more exemplary displays in FIGS. 3B and 3C below.

Figure 3B:
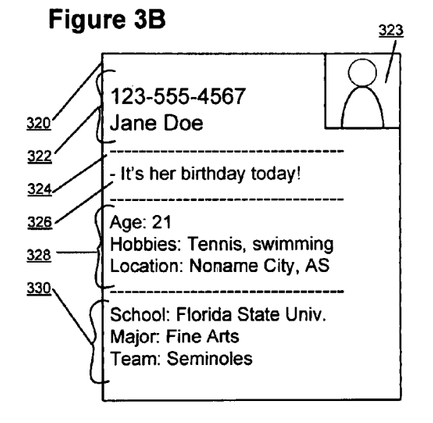
FIG. 3B depicts a display of information in accordance with an illustrative embodiment.

With reference to FIG. 3B, this figure depicts a display of information in accordance with an illustrative embodiment. Display 320 may be implemented using display 300 in FIG. 3A.

Assuming that the caller is calling the called party for a personal matter, display 320 may include caller ID information 322, which may be similar to caller ID information 302 in FIG. 3A. Additional information about the caller may be configured such that picture 323 of the caller may be available as additional information when the caller makes a personal call. Picture 323 may be an photograph, an icon, an image, a graphic, a logo, or any other similarly displayable data. Again, the additional information displayed on display 320 may be grouped together using some visual cues. In this example, dividing line 324 provides visual separation between groups of information.

Additional information about the caller may be further configured such that message 326 is displayed regardless of the nature of the call the caller makes. Comparing the exemplary displays of FIGS. 3A and 3B, note that message 306 in FIG. 3A is the same as message 326 in FIG. 3B. Of course, in a particular implementation, the additional information about the caller may be configured such that messages 306 and 326 are different.

A caller may indicate the nature of a call simply by dialing a number. Dialing a number is only used as exemplary and is not limiting on the illustrative embodiments. For example, the number may be a called party's phone number, the phone number's prefix or suffix, a typed in full or partial name, a function key, a speed-dial key or number, or any other data entry for the purposes of making a call.

In addition to the additional information about the caller, the caller may configure a set of numbers on the server, such as server 208 in FIG. 2, and classify each number as being a business contact or a personal contact. If the server determines that the called number requesting additional information about the caller matches a number identified as a business contact by the caller, the server delivers a certain set of additional information. Conversely, if the request for additional information originates from a number identified as a personal contact by the caller, the server may deliver a separate set of additional information. In each case, the server may also deliver information that the caller wishes delivered regardless of the nature of the call.

A particular implementation may use other methods of determining the nature of a call For example, the server may determine that the called party's name indicates a business entity by including words or abbreviations such as Corporation, Corp., Inc., Ltd., PC, LLC, LLP and other commonly used forms of entities. The server may decide to deliver additional information that the caller has identified for business calls in response to requests from such callers.

Continuing with the example of a personal call in FIG. 3B, additional information may include personal profile 328 and personal affiliations 330 of the caller. As shown, the called party is informed that the caller is 21 years of age, located in Noname City in state AS, enjoys tennis and swimming, has attended Florida State University, majoring in Fine Arts, and is a fan of the Seminoles, the football team at that university. As described with respect to FIG. 3A above, display 320 may include scrolling capability so that additional information exceeding the display area of display 320 may be displayed.

Figure 3C:
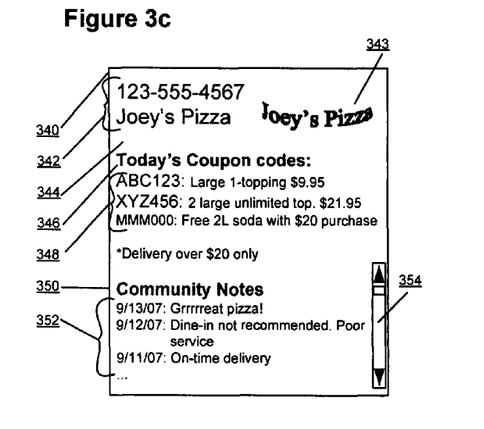
FIG. 3C depicts a display of information in accordance with an illustrative embodiment.

With reference to FIG. 3C this figure depicts a display of information in accordance with an illustrative embodiment. Display 340 may be implemented using display 300 in FIG. 3A or display 320 in FIG. 3B.

A business may want to display its information when someone calls their number. To wit, when a caller calls the business—the called party—the caller receives additional information about the called party. In the exemplary display 340 of FIG. 3C, the called party is "Joey's Pizza" as indicated by called party's information 342. Galled party's logo 343 may also be optionally displayed on the caller's display.

As shown, the additional information is logically grouped using blank space 344 as the separator. Grouping of information is further identified by topic 346, which in this case stands out because of the type of font used for displaying the title. Joey's Pizza may want the callers to know their promotions that may help the caller in their transaction with the business—purchasing pizzas. Information 348 informs the caller about the coupon codes they can use while placing an order.

The caller ID information associated with a phone number is provided by the telecommunication services company, the phone company, or a similar source, that provides services for that phone number. In contrast, additional information about a phone number may be provided by the party associated with the phone number. Furthermore, additional information about a party, whether a calling party or a called party in a specific call, may include information provided by sources other than the party. For example, additional information about Joey's Pizza may include feedback from previous customers. Community messages topic 350 may be displayed as described above, and community messages 352, which may include feedback, comments, other information from the members of a particular community relating to the business establishments. Again, display 340 may include scrolling capability 354 that a user may use to display additional information that exceeds the display area of display 340.

In particular implementations, any kind of messages contributed by anyone may be included in the additional information that is displayed on a display. For example, in a university dormitory, student residents may contribute messages to each other's additional information as well as the additional information for commonly called services numbers. As another example, family members may form their own community and contribute to each other's additional information that may be displayed when a family member receives a call from another family member or calls another family member.

Furthermore, particular implementations may organize and display the additional information differently from as shown in FIGS. 3A-C Additionally, particular implementations may restrict the additional information in manners other than the nature of the call or identification of the party requesting additional information as exemplarily described above. Many other situations, contributors, configurations, and display restrictions can be envisioned from this disclosure and are contemplated within the scope of the illustrative embodiments.

Figure 4:
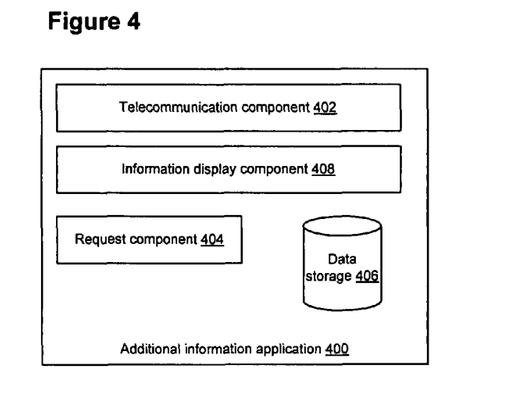
FIG. 4 depicts a block diagram of an additional information application in accordance with an illustrative embodiment.

With reference to FIG. 4, this figure depicts a block diagram of an additional information application in accordance with an illustrative embodiment. Additional information application 400 may be implemented in phone 202 in FIG. 2 and may display information in the manner of any of FIGS. 3A-C The illustration of this figure is described with respect to a called party retrieving additional information about a caller for the clarity of the description. An implementation of additional information application 400 may function in the manner described below for displaying additional information about a called party as well.

Additional information application 400 may include telecommunication component 402 using which additional information application 400 receives the identification of the caller, such as by receiving a caller ID. When additional information application 400 displays information about a called party, telecommunication component 402 may receive the number being called.

Telecommunication component 402 may identify a party, whether a caller or a called party, from the information telecommunication component 402 receives, such as in a caller ID or a called number. Using the party identification from the telecommunication component 402, request component 404 may construct a request for additional information about the party. Additional information application 400 may also include data storage 406 for storing some or all of the information about some parties. Data storage 406 may be a data storage internal to the server running additional information application 400 or external but accessible to application 400. Furthermore, data storage 406 may be a relational database, an object oriented database, a flat file, an index file, or any other form suitable for storing data.

Data storage 406 may store static information about a set of callers and a set of called parties. Static information is information about a party that does not change over a period of time. For example, a name or an address associated with a number is not likely to change every day and may be treated as static information related to the number. As other examples, age, profession, affiliations, business name, position, and many other pieces of information associated with a party are not likely to change frequently, and may be treated as static information.

In contrast, promotions, messages, feedbacks, event information, and several other pieces of information that may be included in the additional information can change from one call to the next to or from the same party. Such information may be treated as dynamic information component of the additional information about a party.

Returning to additional information application 400 in FIG. 4, data storage 406 may store static information as described above. Thus, request component 404 may create and send a request for only dynamic portion of the additional information. Request component 404 may use telecommunication component 402 for sending requests for additional information and receiving the additional information in response.

Particular implementations may implement the restriction on the request, such as to request dynamic information only, static information only, or both types of information in the additional information about one or more parties, differently. For example, one implementation may restrict the request by using a code in the request. Another implementation may receive only dynamic information by default, and static information upon sending a separate request. Another implementation may determine on the server whether a requestor has requested both static and dynamic information about a party within a pre-set period, and may send only the dynamic information if true. If false, the server may proactively send static information as well as dynamic information. Many other ways of requesting additional information will become apparent from this disclosure and may be used with the illustrative embodiments without departing from the scope of the principle of the present invention.

Information display component 408 displays the additional information about the caller or the called party received in response to the request made by request component 404. Information display component 408 may include functions to support formatting and scrolling capabilities for displaying the additional information.

The components of additional information application 400 are selected for clarity of the description, and are described only as exemplary. Particular implementations may add additional components or alter the described components according to specific needs of the implementations.

Figure 5:
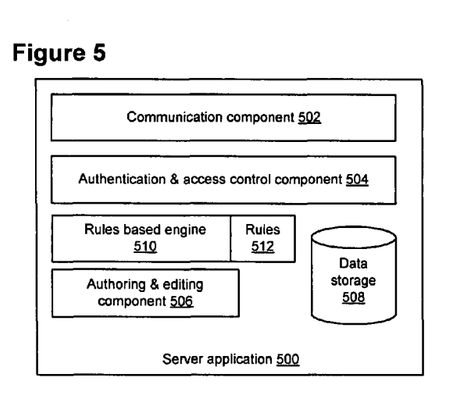
FIG. 5 depicts a block diagram of a server application in accordance with an illustrative embodiment.

With reference to FIG. 5, this figure depicts a block diagram of a server application in accordance with an illustrative embodiment. Server application 500 may be implemented in a server, such as server 208 in FIG. 2, that is accessible over a data network by a communication device.

Server application 500 may include communication component 502. Communication component 502 may enable server application 500 to receive requests for additional information and send corresponding responses.

Server application 500 may be configured to deliver additional information only to valid requestors of that information. For example, a party may configure a list of numbers to whom they would like the additional information delivered. The party may not wish for their additional information to be delivered to a requestor who is not on the party's numbers list.

As another example, a party may configure their personal profile to be delivered to a list of names or numbers but not to any other requestor, but may configure their business profile to be delivered to any requestor. Authentication and access control component 504 may authenticate a requestor and/or the request for additional information, and administer the access control using an access control function.

An access control function may use access types to control access to the additional information. Access type is way of distinguishing who the requestor may be, and is used to determine a type of access the requestor is allowed to have to the additional information. For example, a requester may have an access type of "business," and consequently may be allowed by the access control function to receive only the portion of the additional information that the user has identified as suitable for delivery to a business requestor. As another example, a requestor of access type "personal" may gain access to the portion of the additional information that the user has identified as suitable for delivery to a requestor of a personal nature. Other examples of access types may include manager, peer, colleague, competitor, sales, marketer, government, media, family, distant family, and any other classification suitable for controlling access to additional information. A specific implementation may employ any authentication and access control scheme without departing from the scope of the illustrative embodiments.

Authoring and editing component 506 may provide a user the capabilities to author a new set of additional information or edit an existing set of additional information. A set of additional information is one or more pieces of information in an additional information, or one or more additional information. A party may be able to create additional information for themselves, edit their own additional information, or edit someone else's additional information. For example, a user whose name may be associated with a phone number may create additional information for herself, including personal profile, business profile, business information, personal affiliations, messages, photographs, graphics, and any other type of information the user deems fit for display to others. The user may further configure the access to such information such that certain requestors may receive one part of the additional information, and certain other requestors may receive another part of the additional information.

Furthermore, the user may be able to configure whether certain pieces of information are always to be displayed, to be displayed on certain days and times, to be displayed first when displayed, to be displayed in a certain manner of font or color, changed periodically or upon certain events, and any other similar configurations pertaining to display of information. For example, special messages, such as "It's her birthday today" may be configured to be displayed only on the date of the user's birth, displayed as the first piece of information, to any requestor in her authorized list of personal contacts, and in bold fonts.

Data storage 508 stores the additional information thus created and manipulated by the users. Data storage 508 may be a data storage internal to the server running server application 500, or external but accessible to server application 500. Furthermore, data storage 508 may be a relational database, an object oriented database, a flat file, an index file, or any other form suitable for storing data.

Rules based engine 510 executes one or more rule in rules 512. The rules are configured to accomplish directives or logic needed by the users or server application 500 as a whole. For example, the user's configuration of the additional information, user's control of the distribution thereof, user's control of who may edit that information are some examples of user oriented rules that may be included in rules 512. Rules 512 may further include rules directed towards server application 500's needs, such as authentication logic and access control procedures.

Thus, by executing specific rules in rules 512, rules based engine 510 may assist the user in accomplishing user's configuration whether certain pieces of information are always to be displayed, to be displayed on certain days and times, to be displayed first when displayed, to be displayed in a certain manner of font or color, changed periodically or upon certain events, and any other similar configurations pertaining to display of information. Also, by executing specific rules in rules 512, rules based engine 510 may assist server application 500 in accomplishing authentication and access control of a requestor and/or a request for additional information, authentication and access control of users editing other users' additional information, and other similar functions of server application 500.

Furthermore, by executing specific rules in rules 512, rules based engine 510 may assist server application 500 in indicating that a part of the additional information being delivered in response to a request is static and may be saved, where as another part of the additional information is dynamic and should not be saved. For example, the delivered additional information may be in the form of extensible markup language (XML) document and may include tags identifying the various sections. Many other rules for user or server actions are conceivable from this disclosure.

Server application 500 and its various components have been depicted as they are in FIG. 5 only as exemplary and are not limiting on the illustrative embodiments. A particular implementation of server application 500 may add additional components, or remove or modify the depicted components according to the particular implementation needs without departing form the scope of the illustrative embodiments.

Figure 6:
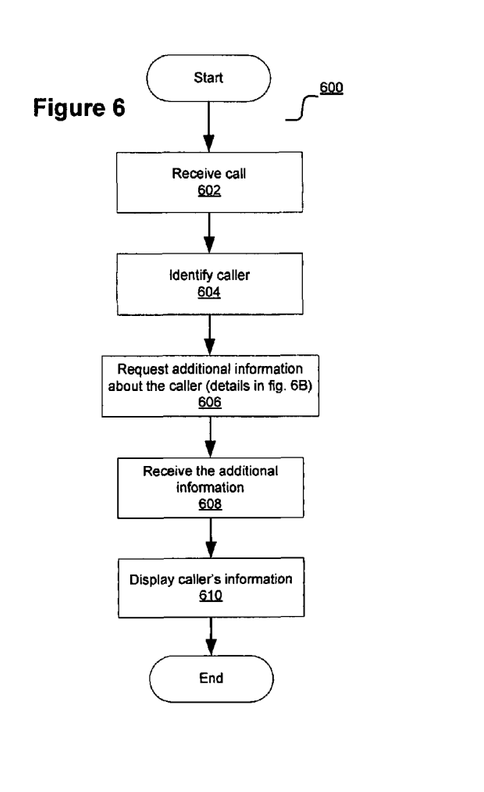
FIG. 6 depicts a flowchart of a process of requesting additional information about a caller in accordance with an illustrative embodiment.

With reference to FIG. 6, this figure depicts a flowchart of a process of requesting additional information about a caller in accordance with an illustrative embodiment. Process 600 may be implemented using additional information application 400 in FIG. 4.

Process 600 begins by receiving a call (step 602). The process identifies the caller, such as from the caller ID (step 604). The process requests additional information about the caller (step 606). Details of step 606 are further described with respect to FIG. 6B.

Process 600 receives the requested additional information (step 608). In certain implementations, if the request or the requestor are not authenticated, the process may not receive the response of step 608 or may receive a notification of failure of the authentication, and may end thereafter.

After the requested additional information is received, the process displays the additional information (step 610). The process ends thereafter.

Figure 6A:
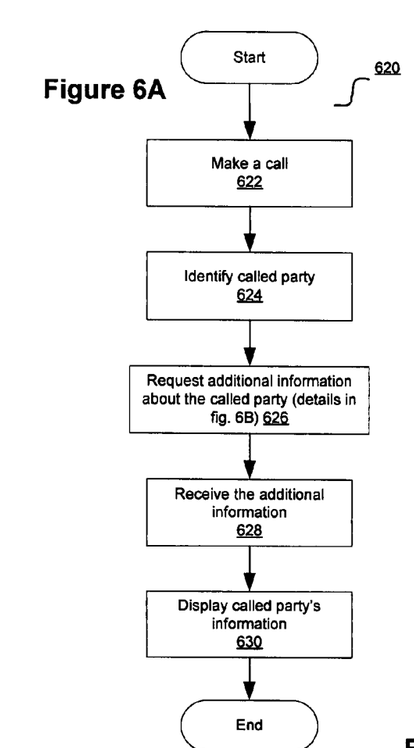
FIG. 6A depicts a flowchart of a process of requesting additional information about a called party in accordance with an illustrative embodiment.

With reference to FIG. 6A, this figure depicts a flowchart of a process of requesting additional information about a called party in accordance with an illustrative embodiment. Process 620 may be implemented using additional information application 400 in FIG. 4.

Process 620 begins by placing a call (step 622). The process identifies the called party, such as from the dialed number (step 624). The process requests additional information about the called party (step 626). Details of step 626 are similar to the details of step 606 in FIG. 6, and are further described with respect to FIG. 6B.

Process 620 receives the requested additional information (step 628). In certain implementations, if the request or the requestor are not authenticated, the process may not receive the response of step 628, or may receive a notification of failure of the authentication, and may end thereafter.

After the requested additional information is received, the process displays the additional information (step 630). The process ends thereafter.

Figure 6B:
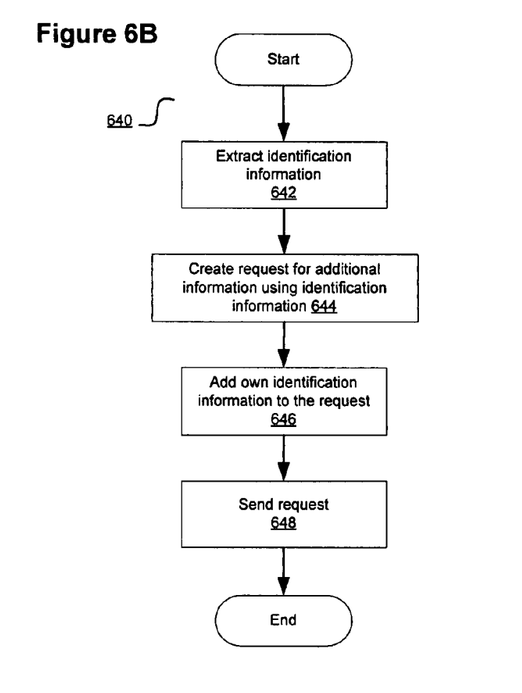
FIG. 6B depicts a flowchart of a process of requesting additional information about a caller or a called party in accordance with an illustrative embodiment.

With reference to FIG. 6B, this figure depicts a flowchart of a process of requesting additional information about a caller or a called party in accordance with an illustrative embodiment. Process 640 may be implemented using additional information application 400 in FIG. 4.

Process 640 begins by extracting identification information of the caller, as in step 606 in FIG. 6, or of a called party, as in step 626 in FIG. 6A (step 642). The process creates a request for additional information for a user identified by the identification information (step 644). The process adds identification information about the requestor of the additional information (step 646). Identification of the requestor may be a name, a phone number, an equipment identification number of a communication device, or any other identification suitable for identifying the requestor to the server application. Note that a particular implementation may send the identification of the requestor separate from the request for the additional information without departing from the illustrative embodiments.

The process then sends the request, which in one embodiment may include the identification of the requestor as well as the identification of the user identified by the identification information in step 642, and in another embodiment may include a request for additional information and a separate request for authentication of the requestor (step 648). The process ends thereafter, to wit, returns to step 608 in FIG. 6, or step 628 in FIG. 6A.

Figure 7:
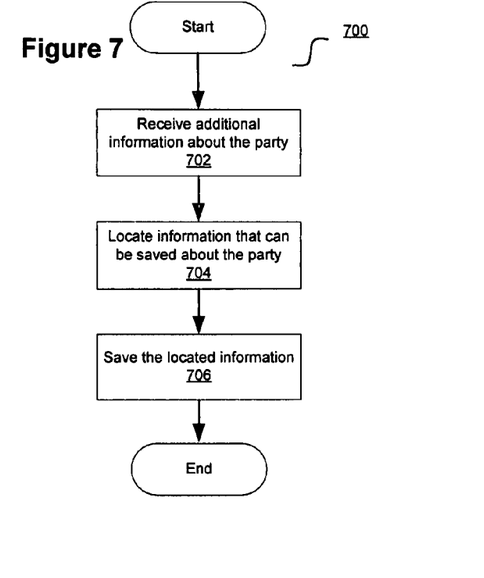
FIG. 7 depicts a flowchart of a process of saving additional information in accordance with an illustrative embodiment.

With reference to FIG. 7, this figure depicts a flowchart of a process of saving additional information in accordance with an illustrative embodiment. Process 700 may be implemented using additional information application 400 in FIG. 4.

Process 700 begins by receiving additional information about a party, such as in response to the request of step 606 in FIG. 6, or in response to the request of step 626 in FIG. 6A (step 702). The process locates information in the received additional information that can be saved (step 704). For example, server application 500 in FIG. 5 may indicate that a part of the additional information being delivered may be static and may be saved, where as another part of the additional information may be dynamic and should not be saved.

Upon locating savable information in the received additional information, process 700 may save the located information, such as in data storage 406 in FIG. 4 (step 706). The process ends thereafter.

Figure 8:
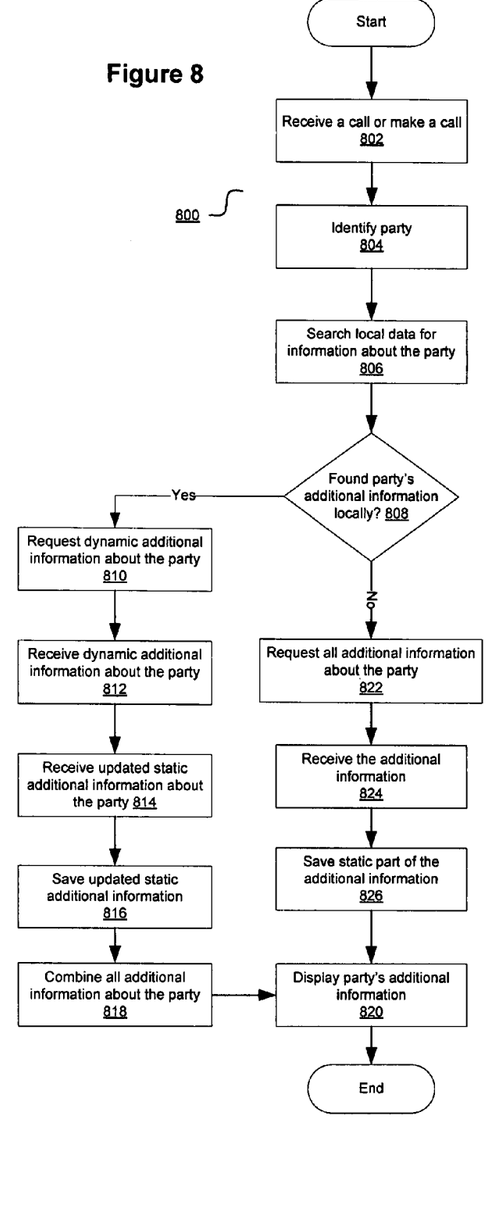
FIG. 8 depicts a flowchart of a process of presenting additional information in accordance with an illustrative embodiment.

With reference to FIG. 8, this figure depicts a flowchart of a process of presenting additional information in accordance with an illustrative embodiment. Process 800 may be implemented using additional information application 400 in FIG. 4.

Process 800 begins by either receiving a call or making a call (step 802). The process then identifies a patty (step 804). If the process receives a call, the process identifies a caller party in step 804, and if the process makes a call, the process identifies a called party in step 804.

The process searches any additional information available locally about the party (step 806). Data available locally is data that is accessible to the additional information application without having to make a request for additional information, such as some static additional information in data storage 406 in FIG. 4.

The process then determines if the process has found additional information about the party locally (step 808). If the process finds the party's additional information locally ("Yes" path of step 808), the process requests dynamic portion of the additional information about the party (step 810). The process receives dynamic additional information about the party (step 812).

The process may also receive updates to the static additional information stored locally (step 814). The process saves the updated static information (step 816). Note that the process may receive incremental updates to the static additional information in one embodiment, and updated static additional information as a whole in another embodiment.

Furthermore, specific implementations of the illustrative embodiments may omit steps 814-816 or may implement steps 814-816 as a separate process for updating locally stored static additional information. Such implementations are within the contemplations of the illustrative embodiments. For example, an implementation may perform a periodic update of static additional information as a separate process and not include steps 814-816 in process 800.

Process 800 then combines the dynamic additional information with the existing or updated static additional information about the party (step 818). The process then displays the combined additional information about the party (step 820). The process ends thereafter.

Returning to step 808, if the process determines that the process has not found additional information about the party locally ("No" path of step 808), the process requests all additional information about the party (step 822). The process receives the additional information about the party (step 824). The process may save the portion of the additional information identified as static (step 826). Note that certain implementations of the illustrative embodiments may not save any additional information about parties, and may request complete additional information each time, thus omitting step 826.

The process then displays the additional information about the party (step 826). The process ends thereafter.

Figure 9:
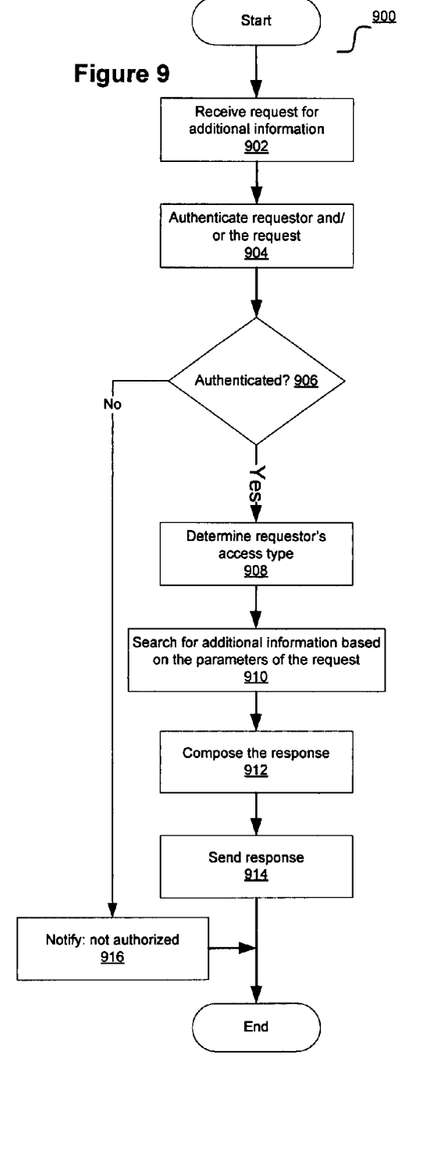
FIG. 9 depicts a flowchart of a process of sending additional information in accordance with an illustrative embodiment.

With reference to FIG. 9, this figure depicts a flowchart of a process of sending additional information in accordance with an illustrative embodiment. Process 900 may be implemented in server application 500 in FIG. 5.

Process 900 begins by receiving a request for additional information (step 902). The process authenticates the requestor, the request, or both (step 904). The process then determines if the requestor, the request, or both have been successfully authenticated (step 906).

If the process determines that the authentication in step 904 is successful ("Yes" path of step 906), the process determines the type of access the requestor has (step 908). For example, a requestor may be a business entity and the process may determine that the access is limited to the business profile, or business information, or any information other than the personal profile of the party whose additional information is being requested. Based on the access type of the requestor, the process searches for the additional information, such as in data storage 508 in FIG. 5, based on the parameters of the request (step 910). For example, a parameter in the request may be any of a party's name, party's number, type of additional information, such as business or personal, or static or dynamic. Any parameter suitable for a particular implementation may be used in the request without departing from the scope and spirit of the illustrative embodiments.

The process then composes the response to the request received in step 902 (step 912). The response contains the requested additional information. The process then sends the response (step 914). The process ends thereafter.

Returning to step 906, if the process determines that the requestor, the request, or both cannot be authenticated ("No" path of step 906), the process may send a notification about the failed authentication to the requestor (step 916). The process ends thereafter. Note that an implementation of the illustrative embodiments may omit the notification step 916.

The various steps of processes 600, 620, 640, 700, 800, and 900 have been chosen and described only as exemplary and are not limiting on the illustrative embodiments. An implementation of the illustrative embodiments may alter, combine, delete or augment these steps without departing from the scope of the illustrative embodiments.

Thus, the illustrative embodiments describe a method, apparatus and computer usable program product for presenting additional information about a telecommunication user. Using the illustrative embodiments, a party receiving a call from a caller can get additional information about the caller and be better prepared for the call as compared to when such additional information is not available. Using the illustrative embodiments, a party placing a call to a called party can also get additional information about the called party and become more aware about the specific circumstances of the called party as compared to without such additional information.

The illustrative embodiments can take the form of an entirely hardware embodiment, an entirely software embodiment or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communication link. This communication link may use a medium that is, for example without limitation, physical or wireless.

The above description has been presented for purposes of illustration and description, and is not intended to be exhaustive or limited to the illustrative embodiments in the form disclosed. Many modifications and variations will be apparent to those of ordinary skill in the art.

What is claimed:

1. A method for receiving additional information about a user at a communication device, the method comprising:
   identifying, at a telecommunication component, the user using a caller ID, the user being a calling party in a telecommunication call;
   constructing, at a request component, a request for information about the user in addition to the information contained in the caller ID;
   sending the request to a repository of additional information;
   receiving, responsive to the request, additional information about the user from the repository;
   displaying, at an information display component, the additional information;
   determining by the telecommunication device whether a part of the received additional information is static information, wherein static information is information about a party that does not change over a period of time, or dynamic information, wherein dynamic information is information about a party that changes from one call to the next; and
   in response to determining that a part of the received additional information is static information, storing the additional static information at the communication device.

2. The method of claim 1, further comprising:
   determining if static additional information about the user is available locally;
   constructing the request such that the request is a request for dynamic additional information if the static additional information about the user is available locally;
   receiving dynamic additional information responsive to the request; and
   combining the static additional information and dynamic information.

3. The method of claim 2, further comprising:
   receiving an update for the static additional information; and
   updating the static additional information.

4. The method of claim 3, further comprising:
   sending a request for updated static additional information for a plurality of users;
   receiving for the plurality of users, one of an incremental update of the static additional information and a complete updated static additional information; and
   updating the static additional information for the plurality of users.

5. The method of claim 2, further comprising:
   constructing the request such that the request is a request for static additional information and dynamic additional information if the static additional information about the user is not available locally;
   receiving static additional information responsive to the request; and
   saving the static additional information locally.

6. A method for receiving additional information about a user at a communication device, the method comprising:
   identifying the user at a telecommunication component, wherein the user is a called party in a telecommunication call;
   constructing, at a request component, a request for additional information about the user,
   sending the request to a repository of additional information;
   receiving, responsive to the request, additional information about the user from the repository;
   displaying, at an information display component, the additional information; and
   determining by the telecommunication device whether a part of the received additional information is static information, wherein static information is information about a party that does not change over a period of time, or dynamic information, wherein dynamic information is information about a party that changes from one call to the next; and in response to determining that a part of the received additional information is static information, storing the additional static information at the communication device.

7. The method of claim 6, further comprising:
determining if static additional information about the user is available locally;
constructing the request such that the request is a request for dynamic additional information if the static additional information about the user is available locally;
receiving dynamic additional information responsive to the request; and
combining the static additional information and dynamic information.

8. The method of claim 7, further comprising:
receiving an update for the static additional information; and
updating the static additional information.

9. The method of claim 7, further comprising:
sending a request for updated static additional information for a plurality of users;
receiving for the plurality of users, one of an incremental update of the static additional information and a complete updated static additional information; and
updating the static additional information for the plurality of users.

10. The method of claim 7, further comprising:
constructing the request such that the request is a request for static additional information and dynamic additional information if the static additional information about the user is not available locally;
receiving static additional information responsive to the request; and
saving the static additional information locally.

11. A method for providing additional information about a user to a communication device, the method comprising:
receiving, at a request component, a request for the additional information about the user;
determining, at the request component, an access type of the requestor;
selecting the additional information based on a set of parameters in the request and the access type; and
sending the selected additional information in a response to the request;
determining by the telecommunication device whether a part of the selected information is static information, wherein static information is information about a party that does not change over a period of time, or dynamic information, wherein dynamic information is information about a party that changes from one call to the next; and
in response to determining that a part of the received additional information is static information, storing the additional static information at the communication device.

12. The method of claim 11, further comprising:
authenticating at least one of a requestor, the request, and the requestor and the request, wherein determining the access type is performed if the authenticating is successful.

13. The method of claim 12, wherein the determining the access type includes determining the access type of business.

14. The method of claim 11, further comprising:
configuring the selected additional information according to a rule.

15. The method of claim 14, wherein the rule directs one of:
marking a part of the selected additional information as one of static and dynamic, formatting a second part of the selected additional information, and
arranging a plurality of parts of the selected additional information in an order of display.

16. The method of claim 11, wherein receiving the request includes:
receiving an indication that the request is for one of dynamic additional information, complete additional information, and an update of static additional information about the user.

17. The method of claim 16, wherein if the request includes the indication that the request is for dynamic additional information about the user, the response includes the dynamic additional information and the update of static additional information.

18. The method of claim 11, wherein selecting the additional information based on access type also selects additional information about the user that is to be sent irrespective of the access type.

19. A system for providing additional information about a user to a communication device, comprising:
a communication component configured to receive a request sent from a communication device by a requester for the additional information about the user, wherein the additional information is information in addition to a user ID;
an authoring and editing component configured to receive instructions from the requester for editing the additional information about the user; and
an authentication and access control component configured to determine an access type of the requestor, the system configured to select the additional information based on a set of parameters in the request and the access type, and further configured to send the selected additional information in a response to the communication device for display thereon;
an information display component configured to display the selected additional information, and to determine whether a part of the additional information is static information, wherein static information is information about a party that does not change over a period of time, or dynamic information, wherein dynamic information is information about a party that changes from one call to the next; and
a memory at the communication device configured to store static additional information in response to determining that a part of the received additional information is static.

20. The system of claim 19, wherein the authentication and access control component authenticates at least one of a requestor, the request, and the requestor and the request, and wherein the access type is determined if authenticating is successful.

21. The system of claim 20, wherein the access type includes personal access type.

22. The system of claim 19, further comprising:
a rules based engine configured to configure the selected additional information according to a rule.

23. The system of claim 22, wherein the rule one of marks a part of the selected additional information as one of static and dynamic, formats a second part of the selected additional information, and arranges a plurality of parts of the selected additional information in an order of display.

24. The system of claim 19, wherein the request includes:
an indication that the request is for one of dynamic additional information, complete additional information, and an update of static additional information about the user.

25. The system of claim 24, wherein if the request includes the indication that the request is for dynamic additional information about the user, the system is further configured to include in the response the dynamic additional information and the update of static additional information.

26. The system of claim 19, wherein the system is further configured to select additional information about the user that is to be sent irrespective of the access type.

27. A system for receiving additional information about a user at a communication device, comprising:
- a telecommunication component configured to identify the user using a caller ID the user being a calling party in a telecommunication call, and identify the user the user being a called party;
- a request component configured to construct a request for information about the user in addition to the information contained in the caller ID for the user, the information forming additional information, the telecommunication component further configured to send the request to a repository of the additional information and receive, responsive to the request, the additional information about the user from the repository; and
- an information display component configured to display the additional information, and to determine whether a part of the received additional information is static information, wherein static information is information about a party that does not change over a period of time, or dynamic information, wherein dynamic information is information about a party that changes from one call to the next; and
- a memory at the communication device configured to store additional static information in response to determining that a part of the received additional information is static.

28. The system of claim 27, wherein,
the request component further configured to determine if static additional information about the user is available locally in a data storage, and to construct the request such that the request is a request for dynamic additional information if the static additional information about the user is available locally;
the telecommunication component is further configured to receive dynamic additional information responsive to the request; and
the information display component is further configured to combine the static additional information and dynamic information.

29. The system of claim 28, further comprising:
the data storage configured to receive an update for the static additional information and to update the static additional information.

30. The system of claim 28, wherein,
the request component is further configured to construct a request for updated static additional information for a plurality of users;
the telecommunication component is further configured to send the request for updated static additional information for the plurality of users, and to receive for the plurality of users, one of an incremental update of the static additional information and a complete updated static additional information; and
the data storage further configured to update the static additional information for the plurality of users.

31. The system of claim 28, wherein,
the request component is further configured to construct the request such that the request is a request for static additional information and dynamic additional information if the static additional information about the user is not available locally;
the telecommunication component is further configured to receive static additional information responsive to the request; and
the data storage is further configured to save the static additional information locally.

* * * * *